(12) United States Patent
Fairchild

(10) Patent No.: US 9,886,983 B1
(45) Date of Patent: Feb. 6, 2018

(54) STORAGE DRIVE WITH COLLAPSIBLE SUPPORT

(71) Applicant: Western Digital Technologies, Inc., Irvine, CA (US)

(72) Inventor: Robert G. Fairchild, Tustin, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 14/752,701

(22) Filed: Jun. 26, 2015

(51) Int. Cl.
*G11B 33/08* (2006.01)
*G11B 33/02* (2006.01)
*G11B 25/04* (2006.01)
*G11B 33/12* (2006.01)

(52) U.S. Cl.
CPC ............ *G11B 33/08* (2013.01); *G11B 25/043* (2013.01); *G11B 33/124* (2013.01); *G11B 33/025* (2013.01)

(58) Field of Classification Search
None
See application file for complete search history.

(56) References Cited

U.S. PATENT DOCUMENTS

| | | | |
|---|---|---|---|
| 7,701,705 B1 | 4/2010 | Szeremeta | |
| 8,064,194 B2 | 11/2011 | Szeremeta | |
| 8,113,873 B1 | 2/2012 | Sarraf | |
| 8,133,426 B1 | 3/2012 | Yurchenco et al. | |
| 8,358,395 B1 | 1/2013 | Szeremeta | |
| 8,417,979 B2 | 4/2013 | Maroney | |
| 8,462,460 B1 | 6/2013 | Szeremeta et al. | |
| 8,498,088 B1 | 7/2013 | Klein | |
| 8,547,658 B1 | 10/2013 | Szeremeta | |
| 2009/0290294 A1* | 11/2009 | Prest | G11B 33/08 361/679.01 |
| 2011/0273827 A1* | 11/2011 | Kasai et al. | G11B 33/124 361/679.01 |

OTHER PUBLICATIONS

Wally Szeremeta, U.S. Appl. No. 14/314,942, filed Jun. 25, 2014, 26 pages.

\* cited by examiner

*Primary Examiner* — Craig A. Renner
(74) *Attorney, Agent, or Firm* — Knobbe, Martens, Olson & Bear LLP

(57) ABSTRACT

A storage device includes a data drive and an enclosure. Shock absorber mounting holes on the enclosure can receive shock absorbers to connect to the data drive. In this way the data drive can be suspended from the enclosure. The enclosure can also have one or more protrusion. The one or more protrusion can be located such that when the data drive is placed thereon and each shock absorber is placed within a respective shock absorber mounting hole, each shock absorber is aligned with a mounting hole on the data drive. This can allow securement of the respective shock absorber to the respective data drive mounting hole to suspend the data drive. When the data drive is assembled within the enclosure, the one or more protrusion is sized such that an impact on the one or more protrusion by the data drive will destroy the one or more protrusion.

29 Claims, 6 Drawing Sheets

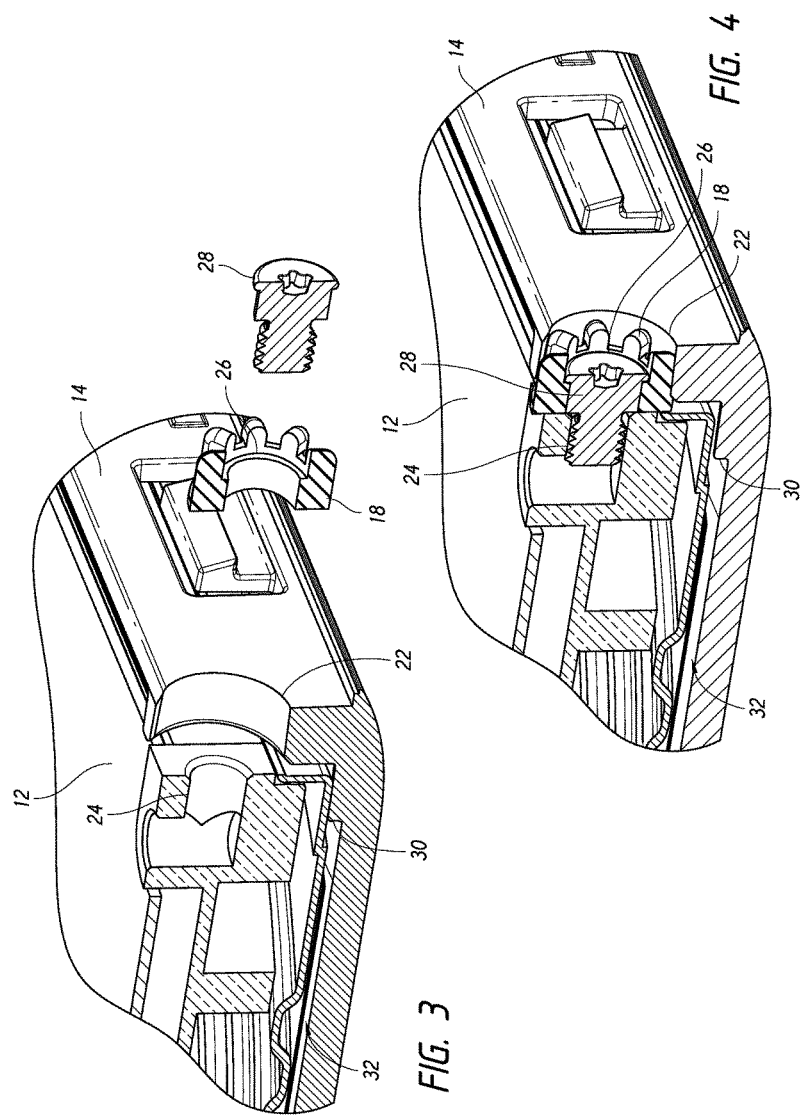

US 9,886,983 B1

STORAGE DRIVE WITH COLLAPSIBLE SUPPORT

BACKGROUND

A hard disk drive (HDD) is a data drive used for storing and retrieving digital information. A HDD generally has one or more rapidly rotating disks with a magnetic head arranged on a moving actuator arm to read and write data to the disk surface. A typical disk is spun at speeds varying anywhere from 4,200 rpm in energy-efficient portable devices, to 15,000 rpm for high performance servers. Other disks may spin at 1,200 rpm, 3,600 rpm, or in the range of 5,400 rpm to 7,200 rpm, though any range of speeds could be used.

Due to the extremely close spacing between the magnetic head and the spinning disk surface, HDDs are vulnerable to being damaged by a head crash—a failure of the disk in which the head scrapes across the platter surface, often grinding away the thin magnetic film and causing data loss. Head crashes can be caused by, among other things, electronic failure, a sudden power failure, physical shock, contamination of the drive's internal enclosure, wear and tear, corrosion, or poorly manufactured disks and heads.

One way to protect a hard disk drive (HDD) from a head crash is to provide protection from physical shock. For example, the hard drive may be isolated from an enclosure and/or other components by shock mounts that are positioned between the hard drive and the enclosure. Various types of shock absorbing materials and systems can be used to decrease the impact of a physical shock on the data drive. This can protect against a head crash, as well as against other types of damage.

BRIEF DESCRIPTION OF THE DRAWINGS

Various embodiments are depicted in the accompanying drawings for illustrative purposes, and should in no way be interpreted as limiting the scope of the inventions.

FIG. 3 is a cross-sectional detail view of the storage drive taken along line 3-3 of FIG. 2.

FIG. 4 is a cross-sectional detail view of the storage drive after installation of the shock absorbers.

DETAILED DESCRIPTION

Figure 1:
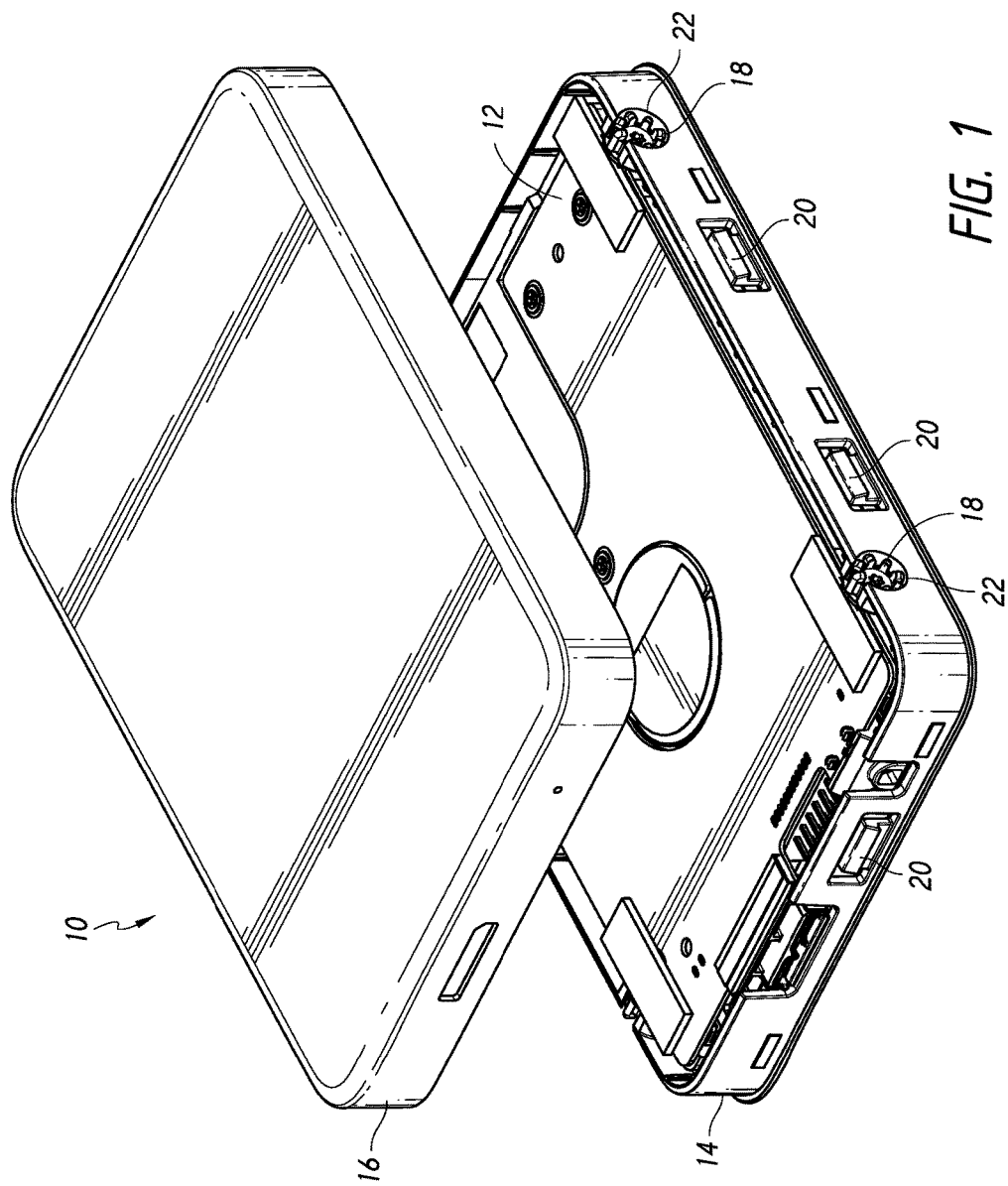
FIG. 1 shows a partially assembled storage drive.

FIG. 1 illustrates an embodiment of a storage drive or device 10 with a shock absorbing system. As shown, the storage device 10 has a data drive 12 suspended within an enclosure 14, 16 through a plurality of shock absorbers 18. Storage drives, such as external hard drives, typically utilize elastomeric shock absorbing systems that suspend the hard disk drive (HDD) within the enclosure. During an applied shock the elastomeric material will compress as the HDD moves thus absorbing/dissipating the energy from the shock wave and protecting the HDD from damage. The HDD moves best if sufficient sway space (free space) is provided between the HDD and the enclosure.

While providing sway space, it is also generally desired by consumers that the enclosure be space efficient (i.e. the smallest form factor possible). Providing features such as maximum shock resistance and a small form factor can be at odds. Further reducing assembly costs and simplifying assembly procedures can also be at odds with providing maximum shock resistance and sway space inside the enclosure.

The desire to provide sway space in a space efficient enclosure can increase manufacturing and assembly costs. For example, a separate assembly fixture may be required to properly position the data drive within the enclosure. During assembly, it may be required to align holes on the HDD with holes in the enclosure. This alignment can allow shock absorbers to be installed to suspend the HDD. To achieve this alignment can require a fixture or tool to suspend or fill the sway space to properly position the HDD in the enclosure for installing the shock absorbers. The extra fixture or tool and assembly steps can increase cost and difficulty of assembly.

Improved systems and manufacturing methods are disclosed herein that can beneficially reduce manufacturing cost while providing size efficient enclosures to house hard drives or other types of data drives. As will be discussed in more detail below, a "collapsible under initial shock" (CUIS) feature in the enclosure can provide the alignment support needed to meet the assembly requirements and also the sway space requirements needed for a shock system. The disclosed storage devices provide many benefits as will be understood by a thorough review of the application.

It will also be understood that the concepts described herein can be employed for other uses and with other devices, including, but not limited to, other types of storage drives, computers, and all types of sensitive electronic devices. For example, the method and system may also be used with data drives such as solid-state drives (SSD) and solid-state hybrid drives (SSHD).

Figure 2:
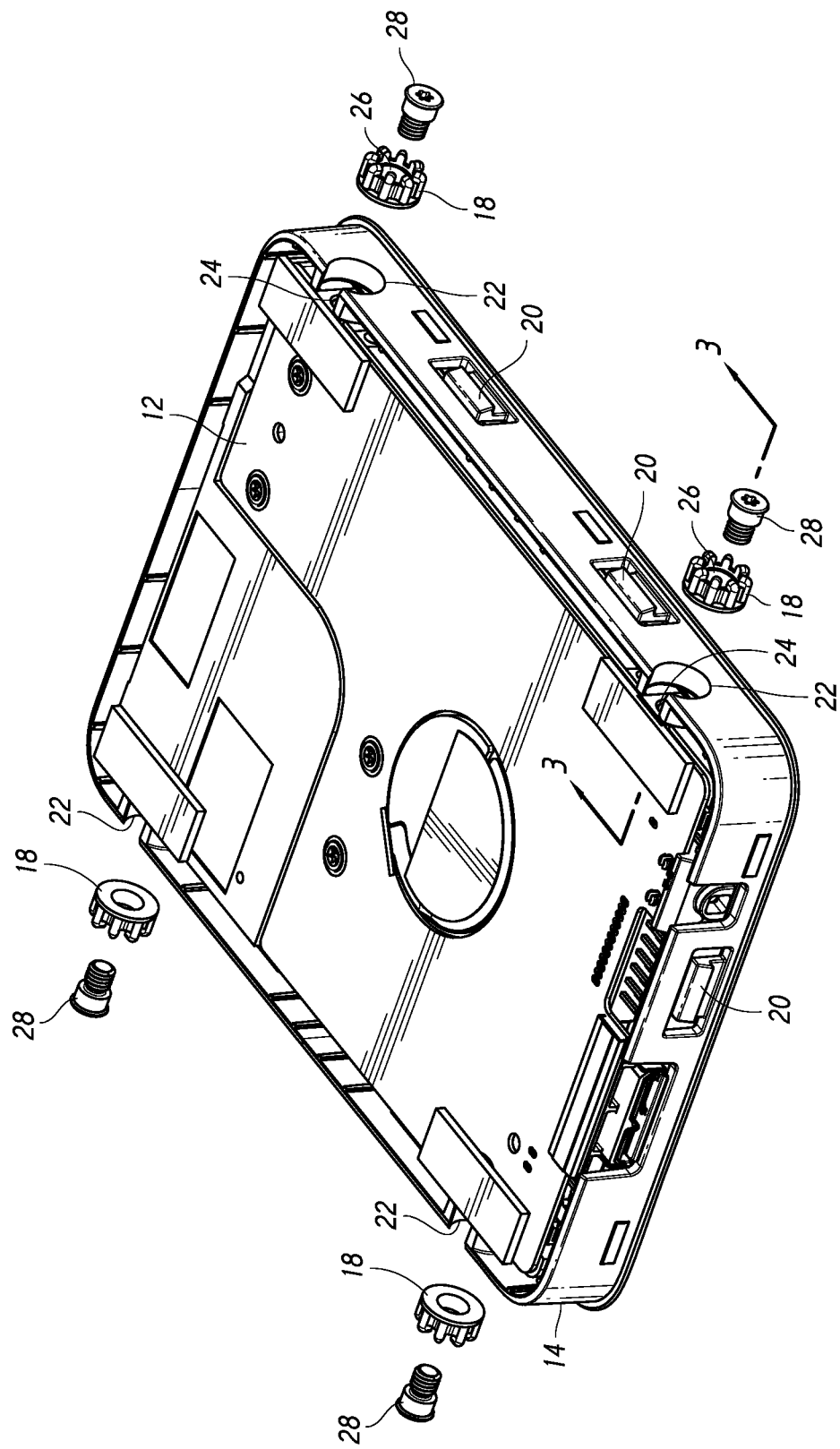
FIG. 2 illustrates a portion of an assembly process of the storage drive.

As mentioned, FIG. 1 illustrates an embodiment of a storage device 10 with a shock absorbing system. The storage device 10 is shown with first 14 and second 16 mating members that combine to form an enclosure. The storage device 10 can include one or more fasteners, such as the illustrated snapfit projections 20, to secure the first 14 and second 16 mating members. A data drive 12, such as the illustrated hard disk drive (HDD) can be positioned within the enclosure as shown in FIGS. 1 and 2.

The first mating member 14 can be used as a type of frame for mounting the data drive 12. In other embodiments a separate frame that is connected to the first mating member can be used. For example, a plastic or metal frame can be positioned within a plastic or metal enclosure. Other materials besides, or in addition to, plastic and metal can also be used. It will be understood that the enclosure is not limited to the configuration, shape, or size shown and may include other components, instead of or in addition to the drive 12.

As shown, the storage device 10 has a data drive 12 suspended within an enclosure 14, 16 through a plurality of shock absorbers 18. The first mating member 14 can include a plurality of mounting holes 22. Each mounting hole can be sized to receive a shock absorber 18. Having the mounting holes 22 molded into or cut into the first mating member 14 can reduce the complexity of having a separate frame and/or of having mating parts of the enclosure that connect around a shock absorber.

At the same time, this configuration can increase the difficulty of aligning mounting holes on a data drive with holes in the shock absorbers for advancing a screw or other fastener. This is because when setting the data drive in the enclosure, it will generally be positioned in the sway space which means that these mounting holes may not be aligned. This can cause difficulty when assembling the storage drive and may require a separate fixture or tool to align the holes.

The illustrated configuration can also facilitate the use of higher quality finishing materials. For example, the tub or first mating member 14 can be made of plastic while the top cap or second mating member 16 can be made of metal and/or be a higher quality material or have a higher quality finish. The illustrated configuration of enclosure can also beneficially be used with enclosure parts that have different characteristics, for example, stress, expansion, malleability, etc.

Looking now to FIG. 3, a detail view of the data drive 12 can be seen positioned in the first mating member 14 of the enclosure. The enclosure can include one or more protrusion 30 that can be used to position the data drive 12 during assembly. As shown, the data drive 12 is placed on the protrusion 30. The protrusion can serve as a support for the data drive within the enclosure during assembly. For example, this can help to ensure that the mounting holes 24 on the data drive 12 and the mounting holes 22 on the enclosure are aligned so that the shock absorber 18 can be connected to the data drive. Further the mounting hole 24 on the data drive 12 can be aligned with the hole 26 in the shock absorber 18.

In the illustrated embodiment, a screw 28 can be advanced into a hole 26 in the shock absorber to then be connected to the data drive. In some embodiments the shock absorber can have an integrated fastener, such as a press-fit or threaded fastener that is advanced into the mounting holes 22 on the enclosure and the mounting holes 24 on the data drive.

It is typical for a HDD to have two pairs of threaded holes 24 on the sides of the HDD as shown. These holes 24, or other holes, on a data drive can be aligned with the mounting holes 22 in the enclosure and/or holes 26 in the shock absorber 18. For the holes to be aligned, the shaft of the fastener 28 needs to be able to engage with the hole 24 on the data drive. Thus, for example with a threaded fastener, if the fastener is rotated correctly but cannot engage threads in the hole 24 it would not be aligned. If the rear most hole is partially obscured it would also not be aligned. Preferably, the hole 24 is smaller than the holes 22 and/or 26 and when aligned the hole 24 is positioned completely with the holes 22 and/or 26 when viewed from the side.

As can be seen comparing FIGS. 3 and 4, the data drive 12 can be placed on the protrusion 30, but then securing the fastener can raise the data drive 12 so that it is no longer sitting on the protrusion 30. In other embodiments, the data drive can continue to sit on one or more protrusion after connection to the shock absorbers 18 and after complete assembly.

Figure 5:
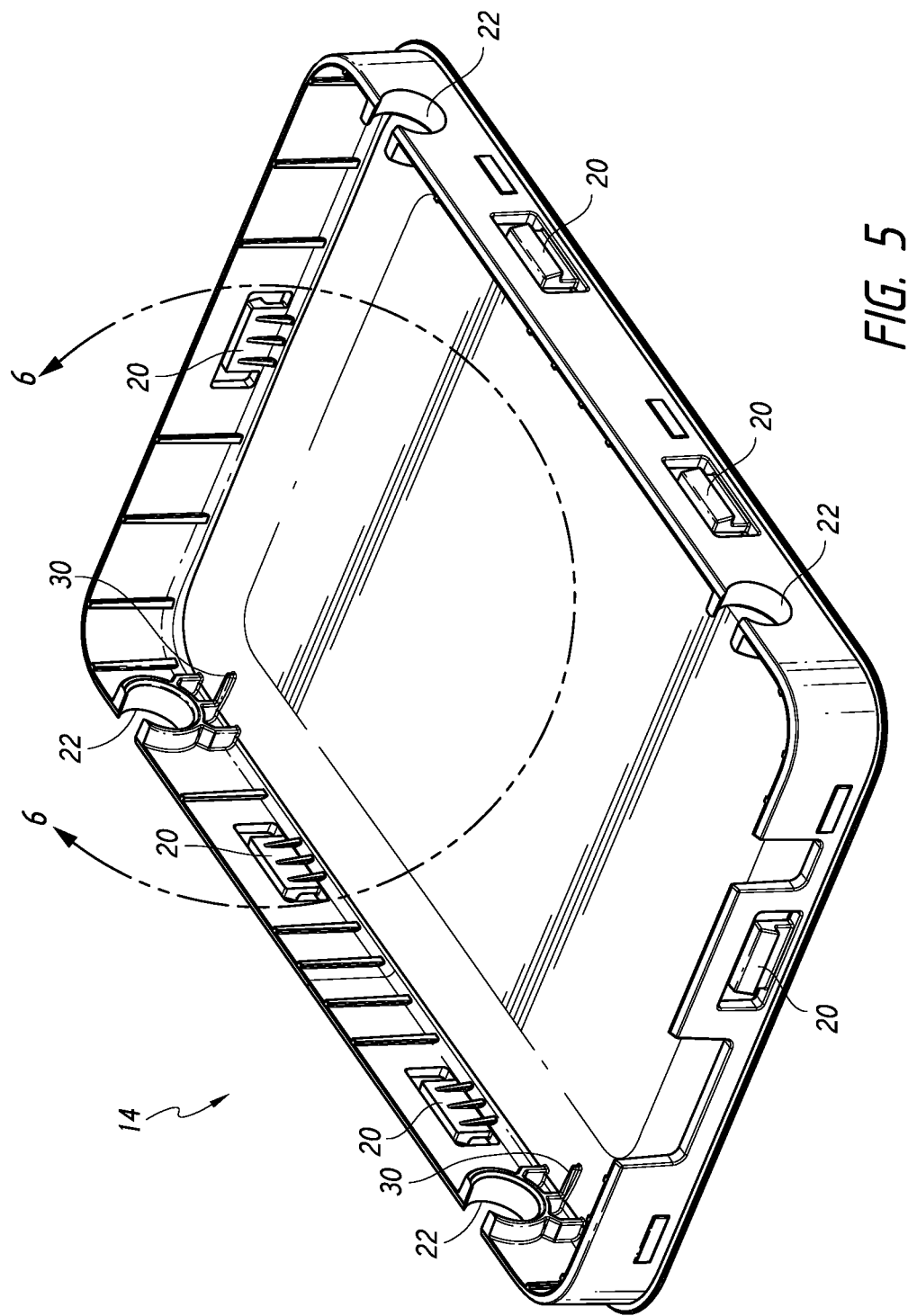
FIG. 5 illustrates an enclosure part.
Figure 6:
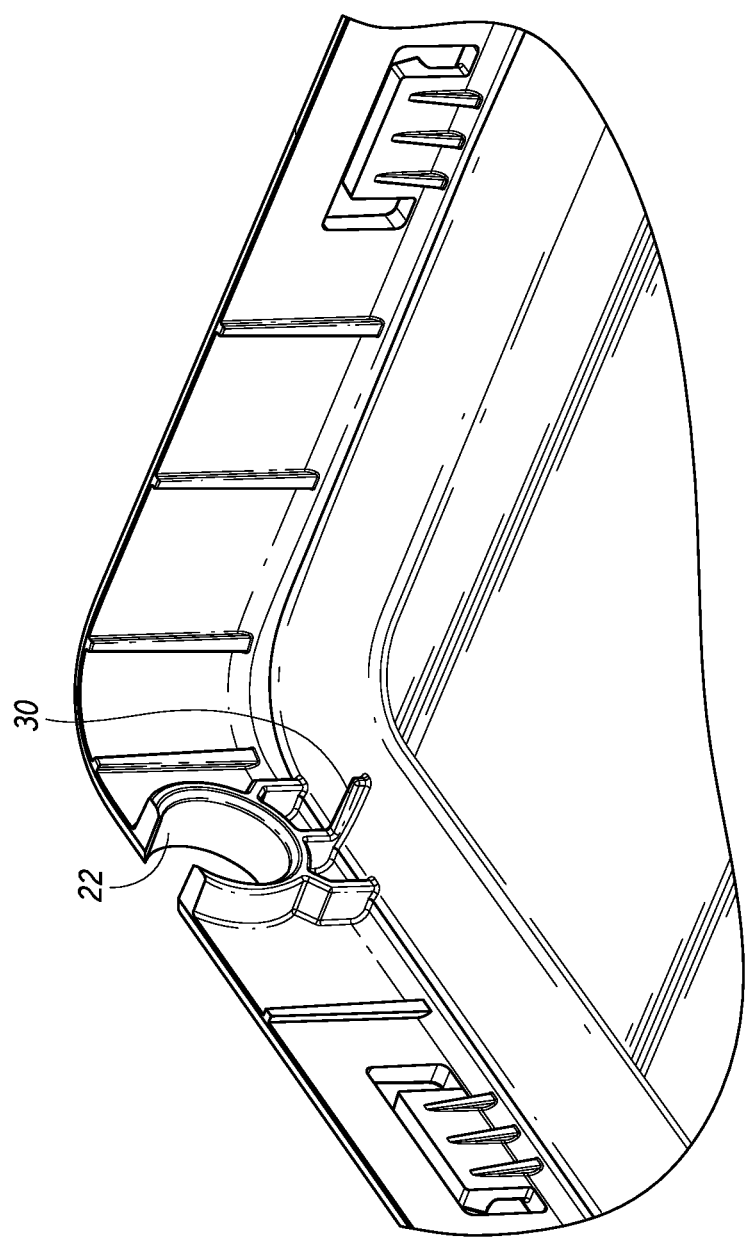
FIG. 6 is a detail of a portion of the enclosure part of FIG. 5.

Turning to FIGS. 5 and 6, the protrusion 30 can be seen in more detail. As shown, the protrusion is a rib that extends upward from the bottom of the tub or first mating member 14 of the enclosure. Four rib-shaped protrusions 30 can be positioned with the first mating member 14, each one adjacent a mounting hole 22. It will be understood that the protrusion(s) can have other shapes, such as an H-shape, T-shape, raised point or points, etc. They can extend straight upwards from the bottom as shown, but also can extend out from the sides, or at an angle. The protrusions are preferably along the outer periphery of the data drive and outer edges of the mating member adjacent the mounting holes, but can also be in the middle or at other various positions of the mating member.

As previously discussed, sway space can be provided to allow the data drive room to move during a shock event. Elastomeric material of the shock absorber(s) will compress as the data drive moves thus absorbing/dissipating the energy from the shock wave and protecting the data drive from damage. The protrusion 30 can be "collapsible under initial shock" to thereby create sway space.

Adding a "collapsible under initial shock" (CUIS) feature to an enclosure can provide the alignment support needed to meet the assembly requirements and also the sway space requirements needed for the elastomeric shock system. With a molded enclosure this can be done at essentially no added cost.

When the data drive 12 is assembled within the enclosure, the one or more protrusion 30 can be sized such that an impact of 600 g-force (g) or less on the one or more protrusion by the data drive will destroy the one or more protrusion to thereby create a sway space 32 (see FIGS. 3 and 4) between the data drive and the first part of the enclosure so that after destruction the hard drive is free to sway within the sway space 32 (see FIGS. 3 and 4) without contacting the first part upon experiencing a shock of 600 g or less.

In some embodiments, the one or more protrusion can be sized such that an impact of 400 g or less on the one or more protrusion by the data drive will destroy the one or more protrusion. In some embodiments, the one or more protrusion can be sized such that an impact of 100-1000 g, 200-600 g, 200-400 g, or 200-300 g on the one or more protrusion by the data drive will destroy the one or more protrusion.

An HDD or other data drive 12 can be rated to experience a set amount of force without damage (a shock rating). The HDD can be a 2.5 inch or 3.5 inch drive in some embodiments. The one or more protrusion can be sized and positioned such that a force of the data drive on the protrusion equal to or less than this rating can destroy the one or more protrusion. For example, the protrusion can be sized and positioned such that a force of the data drive on the protrusion equal to or less than 1/1, 3/4, 2/3, or 1/2 of the shock rating can destroy the one or more protrusion. The one or more protrusion is also preferably sized and positioned to hold the weight of the data drive without damage.

A 2.5 inch hard drive typically weighs around 80 grams. A storage drive with a 2.5 inch hard drive can have one or more protrusion sized to hold at least 80 grams and can be sized such that an impact of 600 g-force (g) or less on the one or more protrusion by the 2.5 inch HDD will destroy the one or more protrusion. In some embodiments, the one or more protrusion can be sized such that an impact of 400 g or less, 100-1000 g, 200-600 g, 200-400 g, or 200-300 g on the one or more protrusion by the data drive will destroy the one or more protrusion.

A 3.5 inch hard drive typically weighs around 700 grams. A storage drive with a 3.5 inch hard drive can have one or more protrusion sized to hold at least 700 grams and can be sized such that an impact of 200-400 g-force (g) or less on the one or more protrusion by the 3.5 inch HDD will destroy the one or more protrusion. In some embodiments, the one or more protrusion can be sized such that an impact of 400 g or less, 100-1000 g, 200-400 g, or 200-300 g on the one or more protrusion by the data drive will destroy the one or more protrusion.

Figure 7:
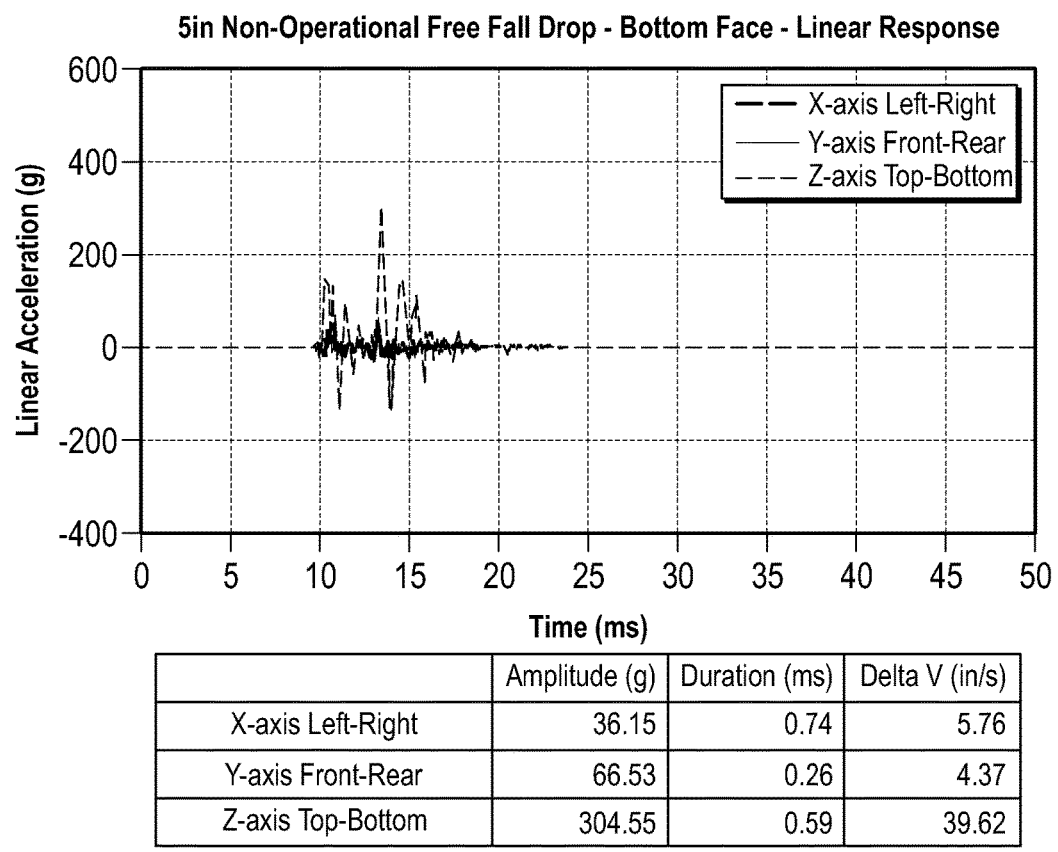
FIG. 7 charts linear acceleration over time for a storage drive during a shock event.

FIG. 7 illustrates the shock experienced from a 5 inch free fall drop with impact on the bottom face of a storage drive with a 2.5 inch HDD. It can be seen the largest amplitude shock experienced was about 305 g on the bottom of the storage drive. In some embodiments, the HDD can have a shock rating of 600 g and can have one or more protrusion sized such that an impact of 200-300 g on the protrusion by the HDD can destroy the one or more protrusion.

In some embodiments, each protrusion can have a length of between 2-5 mm, a width of between 0.3-0.7 mm, and a height of between 0.3-0.7 mm. For example, each protrusion can have a length of 4 mm, a width of 0.5 mm, and a height of 0.5 mm; a length of 3 mm, a width of 0.6 mm, and a height of 0.5 mm; a length of 2 mm, a width of 0.6 mm, and a height of 0.5 mm. In some embodiments, each protrusion can have a volume of between 0.7-1.1 mm$^3$, between 0.8-1.0 mm$^3$, and between 0.9-1.0 mm$^3$. As shown the enclosure can include 4 protrusions, though any number of protrusions can be included.

The addition of a rib like feature molded into the inside bottom base of a HDD enclosure can be used to vertically align HDD side mounting threaded holes with elastomeric shock mounts in the enclosure during the assembly phase. This can make for easy assembly without addition fixtures. The rib like feature can be designed to be "collapsible under initial shock" (CUIS) freeing the elastomeric shock system. The rib like feature can be designed to be "collapsible under shock" (CUIS) equal to, less than, or well below the HDD allowable shock rating or specification.

The one or more protrusion 30 or collapsible under initial shock (CUIS) feature can provide one or more benefit. For example, it can be simple to incorporate into an enclosure. It can be virtually free in a plastic injection molding process. It can provide part assembly alignment within each enclosure part. It can reduce cost of extra assembly fixtures. It can allow assembly to be done without special assembly skills.

In some embodiments, a rib-like feature can be molded into an inside bottom case of an HDD enclosure. The rib-like feature can vertically align HDD side mounting holes with elastomeric shock mounts in the enclosure during assembly. The rib-like feature can be configured to collapse under initial shock load so as to free an elastomeric shock system allowing the HDD to move in sway space between the HDD and the enclosure during a shock event.

In some embodiments, a storage device can include a data drive and an enclosure. Shock absorber mounting holes on the enclosure can receive shock absorbers to connect to the data drive. In this way the data drive can be suspended from the enclosure. The enclosure can also have one or more protrusion. The one or more protrusion can be located such that when the data drive is placed thereon and each shock absorber is placed within a respective shock absorber mounting hole, each shock absorber is aligned with a mounting hole on the data drive. This can allow securement of the respective shock absorber to the respective data drive mounting hole to suspend the data drive. When the data drive is assembled within the enclosure, the one or more protrusion is sized such that an impact on the one or more protrusion by the data drive will destroy the one or more protrusion.

A storage device can comprise a data drive with two or more screw holes, two or more shock absorbers, each with a channel passing therethrough; two or more screws to secure the two or more shock absorbers to the data drive through the two or more screw holes; and an enclosure having at least two parts that connect to form the enclosure. The first part of the at least two parts of the enclosure can have two or more mounting holes, each configured to receive one of the two or more shock absorbers. The first part can also include one or more protrusion. The one or more protrusion can be located such that when the data drive is placed on the one or more protrusion and the shock absorbers are placed within the mounting holes, the channel in the shock absorber is aligned with the screw hole in the data drive to allow advancement of the screw through the channel to secure the shock absorber to the data drive. When the data drive is assembled within the enclosure, the one or more protrusion can be sized such that an impact of 600 g-force (g) or less on the one or more protrusion by the data drive will destroy the one or more protrusion to thereby create a sway space between the data drive and the first part of the enclosure so that after destruction the hard drive is free to sway within the sway space without contacting the first part upon experiencing a shock of 600 g or less.

In some embodiments, the one or more protrusion comprises two or more protrusions; each protrusion of the two or more protrusions extends from a bottom of the first part at one of the two or more mounting holes. The one or more protrusion can comprise four protrusions, the two or more screw holes can comprise four screw holes, the two or more shock absorbers can comprise four shock absorbers, the two or more screws can comprise four screws, and the two or more mounting holes can comprise four mounting holes. Each of the four protrusions can extend from a bottom of the first part at one of the four mounting holes.

According to some embodiments, a storage device can include a data drive with two or more data drive mounting holes; two or more shock absorbers; and an enclosure having at least two parts that connect to form the enclosure. A first part of the at least two parts of the enclosure can have two or more shock absorber mounting holes, each configured to receive one of the two or more shock absorbers; and one or more protrusion. The one or more protrusion can be located such that when the data drive is placed on the one or more protrusion and the two or more shock absorbers are each placed within respective shock absorber mounting holes of the two or more shock absorber mounting holes, each shock absorber is aligned with one of the two or more data drive mounting holes to allow securement of the respective shock absorber to the respective data drive mounting hole to thereby suspend the data drive from the enclosure through the two or more shock absorbers.

A method can comprise one or more of the following steps. Impacting one or more protrusion with a hard drive, wherein the hard drive is positioned within an enclosure and secured to the enclosure through one or more shock absorber, the one or more protrusion positioned within the enclosure and obstructing a sway space between the hard drive and the enclosure, and the one or more protrusion having previously served as a support for the hard drive within the enclosure during assembly. Destroying the one or more protrusion by the impact of the hard drive on the one or more protrusion so that the hard drive is suspended within the enclosure through one or more shock absorbers without obstruction within the sway space between the hard drive and the enclosure.

Impacting one or more protrusion with the hard drive can comprise impacting four protrusions with the hard drive and destroying the one or more protrusion by the impact of the hard drive comprises destroying four protrusions. Impacting one or more protrusion with the hard drive can comprise impacting the one or more protrusion with an impact of 600 g or less.

The method can further comprise supporting the hard drive within the enclosure with the one or more protrusion prior to impacting one or more protrusion with the hard drive. Supporting the hard drive within the enclosure with the one or more protrusion can further comprise supporting the hard drive within the enclosure being in a rest position with a bottom surface of the hard drive in contact with a surface of the one or more protrusion.

A method can comprise one or more of the following steps. Placing one or more shock absorbers in mounting holes on a first part of an enclosure. Placing a data drive on one or more protrusions within the first part of the enclosure, mounting holes on the data drive being aligned with holes in the shock absorbers in the mounting holes. Attaching the shock absorbers to the data drive by advancing fasteners through the holes in the shock absorbers and securing the fasteners to the mounting holes in the data drive. In some embodiments the fasteners are screws. Connecting a second part of the enclosure with the first part to form the enclosure and a fully assembled storage drive. The storage drive experiencing a shock event such that an impact of the data drive on the one or more protrusion destroys the one or more protrusion creating a sway space between the data drive and the enclosure, the data drive being suspended within the enclosure through the shock absorbers.

In some assembly methods, the shock absorber are installed in the mounting holes prior to the data drive being positioned within either part of the enclosure. In other assembly methods, the data drive is placed within the enclosure before the shock absorbers are placed within the enclosure.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

What is claimed is:

1. A storage device comprising:
two or more shock absorbers; and
an enclosure comprising one or more protrusion, the enclosure configured to house a data drive via the shock absorbers, the shock absorbers configured to decrease an impact from a shock on the data drive;
wherein the one or more protrusion is configured such that an impact of a predetermined force on the one or more protrusion by the data drive will destroy the one or more protrusion; and
wherein the one or more protrusion is configured such that an impact of 100-1,000 g-force (g) on the one or more protrusion by the data drive will destroy the one or more protrusion.

2. The storage device of claim 1, wherein the one or more protrusion is configured such that the impact of the predetermined force destroys the one or more protrusion to create a sway space between the data drive and the enclosure so that the data drive is free to sway within the sway space.

3. The storage device of claim 2, wherein the enclosure or any other parts connected to the enclosure are generally configured to not contact the data drive in the sway space.

4. The storage device of claim 1, wherein the one or more protrusion is configured such that an impact of 100-600 g on the one or more protrusion by the data drive will destroy the one or more protrusion.

5. The storage device of claim 1, wherein the one or more protrusion is configured such that an impact of 200-400 g on the one or more protrusion by the data drive will destroy the one or more protrusion.

6. A storage device comprising:
a data drive with two or more screw holes;
two or more shock absorbers, each with a channel passing therethrough;
two or more screws to secure the two or more shock absorbers to the data drive through the two or more screw holes; and
an enclosure having at least two parts that connect to form the enclosure, a first part of the at least two parts of the enclosure having:
two or more mounting holes, each configured to receive one of the two or more shock absorbers; and
one or more protrusion, the one or more protrusion located to position the data drive in the first part such that the channel of the shock absorber in the mounting hole is aligned with the screw hole in the data drive to allow advancement of the screw through the channel to secure the shock absorber to the data drive;
wherein the one or more protrusion is sized such that an impact of 100-1,000 g-force (g) on the one or more protrusion by the data drive will destroy the one or more protrusion to thereby create a sway space between the data drive and the first part of the enclosure so that the data drive is free to sway within the sway space without contacting the first part.

7. The storage device of claim 6, wherein the one or more protrusion is sized such that an impact of 100-600 g on the one or more protrusion by the data drive will destroy the one or more protrusion.

8. The storage device of claim 6, wherein the one or more protrusion is sized such that an impact of 200-400 g on the one or more protrusion by the data drive will destroy the one or more protrusion.

9. The storage device of claim 6, wherein the one or more protrusion is sized such that an impact of 200-300 g on the one or more protrusion by the data drive will destroy the one or more protrusion.

10. The storage device of claim 6, wherein the data drive is a 2.5 inch hard drive.

11. The storage device of claim 6, wherein the data drive is a 3.5 inch hard drive.

12. The storage device of claim 11, wherein the one or more protrusion is sized such that an impact of 200-300 g on the one or more protrusion by the data drive will destroy the one or more protrusion.

13. The storage device of claim 6, wherein the one or more protrusion comprises two or more protrusions, and wherein each protrusion of the two or more protrusions extends from a bottom of the first part at one of the two or more mounting holes.

14. The storage device of claim 6, wherein:
the one or more protrusion comprises four protrusions;
the two or more screw holes comprise four screw holes;
the two or more shock absorbers comprise four shock absorbers;

the two or more screws comprise four screws; and the two or more mounting holes comprise four mounting holes.

15. The storage device of claim 14, wherein each of the four protrusions extends from a bottom of the first part at one of the four mounting holes.

16. The storage device of claim 6, wherein the one or more protrusion extends from a bottom of the first part at the mounting hole, there being four mounting holes and four protrusions.

17. The storage device of claim 6, wherein the first part is a bottom portion of the enclosure.

18. A storage device comprising:
a data drive with two or more data drive mounting holes;
two or more shock absorbers; and
an enclosure having at least two parts that connect to form the enclosure, a first part of the at least two parts of the enclosure having:
two or more shock absorber mounting holes, each configured to receive one of the two or more shock absorbers; and
one or more protrusion, the one or more protrusion located to position the data drive in the first part such that each shock absorber in the respective shock absorber mounting hole is aligned with one of the two or more data drive mounting holes to allow securement of the respective shock absorber to the respective data drive mounting hole to thereby suspend the data drive from the enclosure through the two or more shock absorbers;
wherein the one or more protrusion is configured such that an impact of a predetermined force on the one or more protrusion by the data drive will destroy the one or more protrusion; and
wherein the one or more protrusion is configured such that an impact of 100-1,000 g-force on the one or more protrusion by the data drive will destroy the one or more protrusion.

19. The storage device of claim 18, further comprising two or more fasteners, wherein each of the two or more shock absorbers comprises a channel passing therethrough, the channel configured to receive one of the two or more fasteners to secure one of the two or more shock absorbers to the data drive through the two or more data drive mounting holes.

20. The storage device of claim 18, wherein the one or more protrusion is configured such that an impact of 100-600 g-force on the one or more protrusion by the data drive will destroy the one or more protrusion.

21. The storage device of claim 18, wherein the one or more protrusion is configured such that an impact of 200-400 g-force on the one or more protrusion by the data drive will destroy the one or more protrusion.

22. The storage device of claim 18, wherein the one or more protrusion is configured such that an impact of 200-300 g-force on the one or more protrusion by the data drive will destroy the one or more protrusion.

23. The storage device of claim 18, wherein the data drive is a 2.5 inch hard drive.

24. The storage device of claim 18, wherein the data drive is a 3.5 inch hard drive.

25. The storage device of claim 24, wherein the one or more protrusion is configured such that an impact of 200-300 g-force on the one or more protrusion by the data drive will destroy the one or more protrusion.

26. The storage device of claim 18, wherein the one or more protrusion comprises two or more protrusions, and wherein each protrusion of the two or more protrusions extends from a bottom of the first part at one of the two or more shock absorber mounting holes.

27. The storage device of claim 18, wherein:
the two or more data drive mounting holes comprise four data drive mounting holes;
the two or more shock absorbers comprise four shock absorbers; and
the two or more shock absorber mounting holes comprise four shock absorber mounting holes.

28. The storage device of claim 27, wherein the one or more protrusion comprises four protrusions, each of the four protrusions extending from a bottom of the first part at one of the four shock absorber mounting holes.

29. The storage device of claim 18, wherein the one or more protrusion is configured such that the impact of the predetermined force destroys the one or more protrusion to create a sway space between the data drive and the first part of the enclosure so that the data drive is free to sway within the sway space.

* * * * *